United States Patent
Specht et al.

[19]

[11] Patent Number: 6,149,095
[45] Date of Patent: Nov. 21, 2000

[54] DEVICE FOR TIGHTENING A SEATBELT

[75] Inventors: Martin Specht, Feldafing; Jürgen Arold, Niederoberbach, both of Germany

[73] Assignee: Breed Automotive Technology, Inc., Lakeland, Fla.

[21] Appl. No.: 09/349,065

[22] Filed: Jul. 8, 1999

[30] Foreign Application Priority Data

Oct. 7, 1998 [DE] Germany ............ 198 46 227

[51] Int. Cl.7 .................................. F01B 29/08
[52] U.S. Cl. ............................ 242/374; 60/632
[58] Field of Search ............ 242/374; 280/806; 297/480; 60/632, 635, 256

[56] References Cited

U.S. PATENT DOCUMENTS

| | | | |
|---|---|---|---|
| 4,385,775 | 5/1983 | Shimogawa | 280/806 |
| 4,917,210 | 4/1990 | Danicek et al. | 180/268 |
| 5,211,447 | 5/1993 | Sedlmayr et al. | 297/468 |
| 5,495,790 | 3/1996 | Greiner | 92/85 |
| 5,519,997 | 5/1996 | Specht | 60/632 |
| 5,641,131 | 6/1997 | Schmid et al. | 242/374 |
| 5,676,397 | 10/1997 | Bauer | 280/806 |
| 5,842,344 | 12/1998 | Schmid | 60/632 |
| 5,913,486 | 6/1999 | Pywell et al. | 242/374 |
| 6,042,041 | 3/2000 | Foster et al. | 242/374 |

FOREIGN PATENT DOCUMENTS

| | | |
|---|---|---|
| 649779 | 4/1994 | European Pat. Off. . |
| 0629531 | 6/1994 | European Pat. Off. . |
| 4222993 | 7/1992 | Germany . |
| 4227781 | 2/1994 | Germany . |

*Primary Examiner*—Donald P. Walsh
*Assistant Examiner*—William A. Rivera
*Attorney, Agent, or Firm*—Beth Vrioni

[57] ABSTRACT

A device for tightening a vehicle seatbelt has a piston-like drive member arranged in a guide tube. A propellant gas drives the drive member by expanding in a pressure chamber adjoining the drive member. A movement transmitting system connects the drive member and the seatbelt to be tightened. The drive member is a step piston which is provided with a first pressure chamber and a second pressure chamber. A propellant gas discharge system supplies the propellant gas to the pressure chambers. The propellant gas flows into the first pressure chamber and the step piston is set into motion by the propellant gas. The propellant gas acting in the first pressure chamber clears a discharge orifice in the second pressure chamber after covering a first distance so the propellant gas flowing into the second pressure chamber and acting therein additionally drives the step piston.

21 Claims, 6 Drawing Sheets

DEVICE FOR TIGHTENING A SEATBELT

FIELD OF THE INVENTION

The invention relates to a device for tightening a seatbelt.

BACKGROUND OF THE INVENTION

During normal operation of a vehicle, the seatbelt rests loosely on a vehicle occupant's body for reasons of comfort and the layers of belt webbing on the winding shaft of the automatic belt retractor are wound relatively loosely. In the event of an accident there is a risk that the vehicle occupant will be displaced forwardly in spite of the blocking of the winding shaft of the seatbelt retractor. It is known that to avoid the risk of excessive forward displacement of the vehicle occupant, prior to blocking of the winding shaft the belt slackness may be eliminated by a belt tightener. The known belt tighteners act, for example, on the belt buckle or on the winding shaft of the automatic belt retractor.

DISCUSSION OF THE PRIOR ART

EP 0 629 531 A1 teaches a belt tightener with a pyrotechnic device with at least one piston, the driving movement of which is transmitted to the winding shaft of an automatic seatbelt retractor. The piston is arranged in a guide tube and is moved therein in that a driving gas produced by a pyrotechnic propellant charge expands in a pressure chamber in the guide tube and thereby acts on the piston. The moved piston engages with a pinion coupled to the winding shaft and sets it in rotation. Once the piston has reached its end position and the belt is tightened, the automatic belt retractor blocks the belt webbing. With a belt tightener of this type, for example, the piston comprises a rack which drives a pinion coupled to a winding shaft of the automatic belt retractor. During normal operation of the automatic belt retractor, the pinion is able to rotate freely as it is disengaged from the rack. The run-up phase of coupling engagement in which the engagement between the moved piston and the still at rest pinion is produced begins after ignition of the propellant charge. When the moved piston impinges on the still at rest pinion, in the run-up phase, the mass moments of inertia of the moved parts of the automatic belt retractor such as winding shaft and the remaining coil of belt webbing wound thereon have to be moved and overcome. The abrupt engagement results in very high stress on the components that would demand corresponding over-dimensioning of the components with respect to their strength.

DE 42 22 993 A1 teaches a belt retractor with a belt tightener comprising a pyrotechnic piston/cylinder drive. The cylinder contains a pyrotechnic gas generator that is inserted into its free end and a cup-shaped piston which is movable in the cylinder and is slipped over the cylindrical gas generator, forming two working chambers. One working chamber is formed in the piston head and the other working chamber at the narrow annular end of the piston. On ignition of the gas generator, the propellant gas is able to act directly and simultaneously on the acting faces of the two drive chambers for the axial drive of the piston, so that a high initial stress on the components is produced.

SUMMARY OF THE INVENTION

It is an object of the invention to provide a device for tightening a seatbelt in which component-conserving engagement between the driven piston and the drive pinion is ensured.

This object is achieved according to the invention with a device wherein the drive member is a step piston which is provided with a first pressure chamber and a second pressure chamber, in that a propellant gas discharge system for supplying the propellant gas into the pressure chambers in the starting position of the step piston adjoins the step piston in such a way that the first and second pressure chamber are separated from one another and the propellant gas initially flows into the first pressure chamber and in that the step piston which is set into motion by the propellant gas acting in the first pressure chamber clears a discharge orifice into the second pressure chamber after covering a first distance, so that the propellant gas flowing into the second pressure chamber and acting therein additionally drives the step piston.

As a result of the graduated effect of the propellant gas that initially acts in a first step, the step piston is subjected at the beginning to a reduced driving force which effects comparatively gentle acceleration of the step piston in comparison with conventional piston drives. The moved step piston can therefore also be coupled to the movement transmitting system with correspondingly reduced stress on components. If the movement transmitting system comprises a rack on the step piston and a driving pinion which can be engaged with this rack and is coupled to a winding shaft of an automatic belt retractor, the rack can be introduced into the pinion with a reduced driving force. The movement transmitting system, however, can also provide a connection with a belt buckle and can tension it.

Once the movement transmitting system has produced a driving connection, a second step on the step piston can have a driving action and the total acceleration force can be applied to the step piston and the seatbelt coupled thereto.

The propellant gas discharge system preferably contains a tubular discharge portion which extends in an axial longitudinal direction into a recess, forming the first pressure chamber, in the step piston and is sealed at its periphery against an internal face of the recess. Expanding propellant gas which is supplied from the exterior or is produced upstream of or in the discharge portion can therefore be supplied through the discharge portion into the first pressure chamber in the step piston and can therefore drive the step piston.

In an advantageous configuration, the propellant gas discharge system comprises a tubular casing mounted in a closed end part of the guide tube. However, the propellant gas discharge system and the discharge portion can also be an integral part of the guide tube.

The tubular casing can be a deep-drawn part made of aluminum and can comprise a closure cap that is mounted in the closed end part of the guide tube. The closure cap is pressed tightly onto the casing after the introduction of powdered propellant into the casing.

For igniting the propellant charge, the closure cap can be provided with an ignition system that can rest on the closure cap or can penetrate into the closure cap through an orifice in the closure cap.

An ignition system of this type is preferably a mechanical percussion igniter, but can also be an electric igniter.

The tubular discharge portion preferably has a leading axial discharge orifice into the first pressure chamber. In addition, the discharge portion can be so designed that it also comprises lateral discharge orifices. These lateral discharge orifices can open into the second pressure chamber, in particular for the discharge of propellant gas. The leading axial discharge orifice of the tubular discharge portion can be closed thereby and can be opened by the pressure of the ignited propellant charge. The tubular discharge portion can have a closure element in the leading axial discharge orifice, which comprises a notch or weakened area to simplify opening.

The second pressure chamber preferably has a cross section substantially corresponding to the interior of the guide tube minus the tubular casing which extends therein and has approximately the cross-sectional area of the recess in the step piston and is therefore defined by a piston end face of the step piston and the internal faces of the guide tube.

The size ratio of the faces, effective for driving the step piston, of the first and second pressure chamber on the step piston is about 1 to 10, but can advantageously be in the range of 1:5 to 1:15.

For the initial seal between the first pressure chamber and the second pressure chamber, at least one sealing element can be arranged in the recess in the region of the tubular discharge element, to seal the tubular discharge element against the interior of the recess.

A sealing insert is preferably arranged on the lateral walls of the step piston defining the first pressure chamber and rests on the periphery of the discharge portion.

The walls of the step piston adjoining the two pressure chambers can generally comprise a sealing coating. This sealing coating can be a sealing insert which can be produced as a molding and simultaneously has a sealing rim for sealing the step piston against the internal walls of the guide tube.

In an advantageous configuration, the recess on the first pressure chamber comprises an internal region with a cross section which is constant over the axial length of the first path of movement and an adjoining outer region with an enlarged cross section, the enlarged cross section forming the discharge orifice from the first to the second pressure chamber. The cross section of the outer region can increase continuously or also abruptly.

The movement transmitting system advantageously includes a rack on the step piston and a pinion that can engage the rack and is coupled to a winding shaft of an automatic seatbelt retractor for the seatbelt. However, traction cable connections or lever mechanisms can also be used to connect the step piston to the seatbelt, to the belt buckle or to other tensioning components.

If a first tooth of the rack in the direction of movement of the step piston has a reduced tooth height, engagement of the rack in the teeth of the pinion is ensured in every position of the pinion.

The guide tube and the step piston can have a substantially circular or oval cross section, or a substantially rectangular cross section.

The invention also provides in a piston drive, at least one lateral wall of the guide tube adjoining the pressure chamber has a wall thickness which is so dimensioned that, on attainment of a maximum propellant gas pressure in the pressure chamber, a deformation of the lateral wall opens an excess pressure discharge path for the propellant gas. A pressure relief device is created in this way which, for example when the driving piston is blocked in its path of movement or is arranged in the end position of movement, ensures the discharge of propellant gas from the pressure chamber and therefore prevents a part of the piston drive from bursting under the excessive pressure.

This pressure relief device can generally be provided in any cross-sectional shape inasmuch as corresponding dimensioning of the wall thickness is independent of the shape of the walls. In a particularly advantageous configuration, however, the guide tube has a rectangular cross section and the lateral walls of the guide tube which are longer in cross section bulge outwardly.

DETAILED DESCRIPTION OF THE INVENTION

Figure 1:
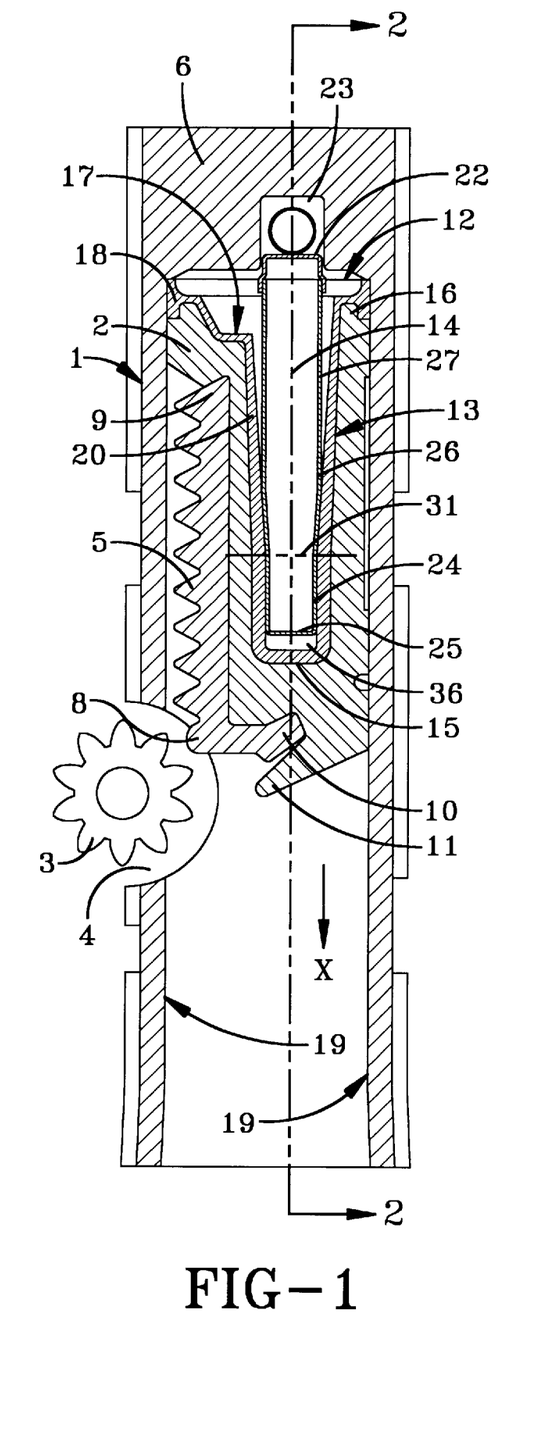
FIG. 1 is a longitudinal section through a first embodiment of a device according to the invention with a step piston in a starting position.
Figure 2:
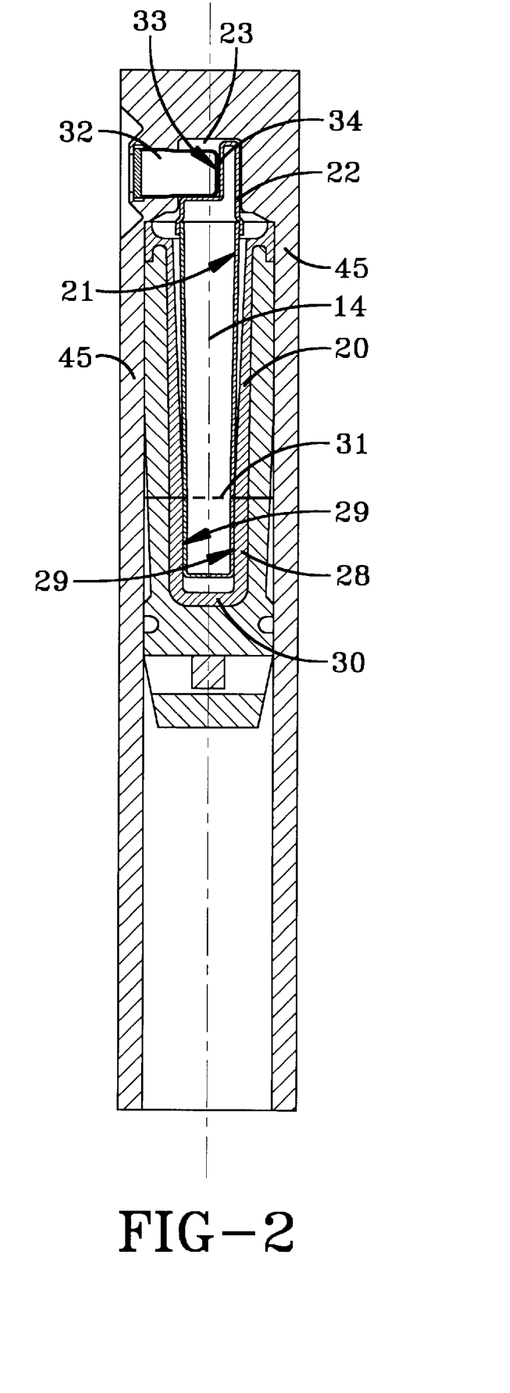
FIG. 2 is a sectional view along line 2—2 in FIG. 1.

An embodiment of a device according to the invention shown in FIGS. 1 and 2 comprises a pressure and guide tube 1 and a drive member or step piston 2 that is moveable therein. The guide tube 1 is associated with an automatic seatbelt retractor (not shown) in such a way that a driven element such as, for example, a pinion 3, which as part of a movement transmitting system, is connected directly or via a gear to a winding shaft of the automatic belt retractor, extends through an orifice 4 in the guide tube 1 into a path of movement of a rack 5 arranged on the step piston 2 (the step piston 2 moves in the direction of the arrow X in FIG. 1).

The step piston 2 is located in a starting or standby position according to FIGS. 1 and 2 on a closed end part 6 of the guide tube 1 and is out of contact with the pinion 3. The step piston 2 and the interior of the guide tube 1 have, in particular, a substantially rectangular or square cross-sectional shape. The step piston is made, for example, from aluminum. The step piston has at its side facing the pinion 3 a cavity in which there is fastened a rack 5. The rack comprises, for example, a plurality of adjacent segments such as, for example, precision punched steel parts, and of which the first tooth 8 in the direction of movement is designed as a half tooth with a shortened tip. The rack 5 is fastened to the step piston 2 on the one hand by a projection 9 of the rack engaging an indentation in the step piston 2 and on the other hand by a holding piece 10 of the rack 5 which is held by a securing projection 11 of the step piston.

The step piston 2 comprises a piston end face 12 turned toward the closed end part 6 of the guide tube 1 and an elongate indentation or recess 13 which extends from the piston end face axially along a center line 14 into the interior of the step piston 2 and ends in an internal piston head 15.

The recess 13 has a substantially rectangular or square cross-sectional shape. An external shoulder 16 is formed on the piston end face at the outer periphery of the step piston.

Figure 9:
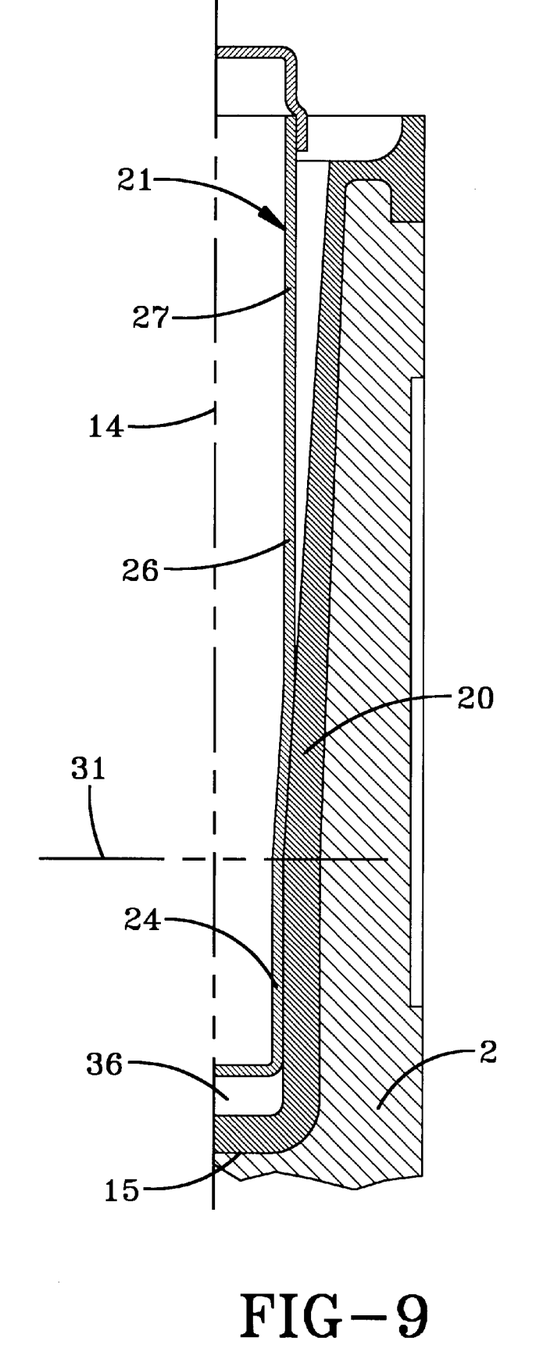
FIG. 9 is an enlarged detail from FIG. 1 with half the side of the step piston.

A piston seal 17 formed as a sealing molding comprises a sealing rim 18 which engages in the shoulder 16 for sealing the step piston 2 against the lateral internal faces 19 of the guide tube 1 and a sealing insert 20 which is adapted to the shape of the piston end face 12 and the recess 13 and forms a continuous sealing layer which covers the entire pressure side or all the pressure faces of the step piston 2.

The piston drive contains a tubular casing 21 as charge carrier for a driving means, which produces a propellant gas. The tubular casing is made, for example, from aluminum. The tubular casing is covered and closed by a pressed-on closure cap 22 which is inserted in an ignition chamber 23 formed in the closed end part 6 of the guide tube 1 in such a way that the tubular casing 21 extends along the center line 14 into the recess 13 in the step piston 2 almost up to the internal piston head 15. The tubular casing is essentially adapted to the cross-sectional shape of the recess 13 and therefore also has a rectangular or square cross section. The tubular casing is divided into three tube portions. A leading first tube portion 24 adjacent to the piston head 15 is formed with a constant cross section and casing walls parallel to the center line 14 and with a leading end face which is closed by a closure part 25. The closure part 25 is produced, for example, integrally with the casing walls and can have notches, which simplify opening or breakage of the closure part 25. The cross section of the casing 21 increases in an adjoining central or second tube portion 26, the casing walls being slightly inclined towards the centerline 14. A third tube portion 27 of the casing extends to the closure cap 22 with for example a substantially constant cross section.

The sealing insert 20 has an internal portion 28 adapted to the leading first tube portion 24 and resting thereon with internal faces 29 parallel to the centerline 14 and a sealing base 30. From a position which is described as changeover point 31 and, in the starting position of the step piston 2 shown in FIGS. 1 and 2, which coincides with the transition between the first and the second tube portion 24, 26, the internal faces 29 of the sealing insert 20 expand in the direction of the upper piston end face 12 so the cross section of the internal space defined by the sealing insert 20 increases.

In a bore formed on the closed end part 6 in the guide tube 1 and leading laterally to the ignition chamber 23 there is inserted a percussion igniter 32 which extends into the ignition chamber and rests with its end face 33 on a hollowed flattened region 34 of the closure cap 22.

To trigger the piston drive and therefore to tighten a seatbelt, a striking bolt (not shown) strikes the percussion igniter 32 so that its explosive charge is ignited. An ignition flame enters the closure cap 22 and ignites the pyrotechnic propellant contained in the casing 21 of the charge carrier (the breakage of the percussion igniter and of the closure cap is not shown in FIG. 4). The leading closure part 25 of the casing 21 is blasted open by the pressure of the propellant gas evolved. The propellant gas flows through the blasted-open propellant gas discharge orifice 35 (shown in FIG. 3) into a first pressure chamber 36 which is defined by the sealing base 30 and the internal faces 29 of the internal portion 28 of the sealing insert 20 and is sealed from the leading first tube portion 24 of the casing 21 resting on the internal faces 29 of the sealing insert. As a result of the pressure of the propellant gas acting in the first pressure chamber 36 against the sealing base 30 and the piston head 15, the step piston 2 is moved with a first driving force corresponding to the size of the base of the first pressure chamber 36 in the direction of the arrow X in the guide tube 1. The first pressure chamber 36 is thereby axially enlarged but remains sealed by the sealing insert 20 due to the contact of the leading tube portion 24 with the casing 21. The rack 5 engages with the pinion 3 and meshes with its teeth, the correct introduction of the rack into the teeth of the pinion 3 being simplified by the reduced half tooth 8.

As the forward movement of the step piston 2 continues, the changeover point 31 of the sealing insert 20 passes the opened closure part 25 of the first tube portion 24 on the discharge orifice 35, the receding internal faces 29 causing an overflow or discharge orifice 37 between the outer periphery of the leading tube portion 24 and the internal faces 29 of the sealing insert to begin opening (see FIG. 3) to allow admission of the propellant gas into a second pressure chamber 38 defined by the upper piston end face 12 of the step piston 2 and the internal faces of the guide tube 1. The driving pressure face of the second pressure chamber is formed by the cross-sectional area of the internal chamber of the guide tube 1 minus the effective base or pressure face on the piston head 15 of the first pressure chamber 36.

Figure 3:
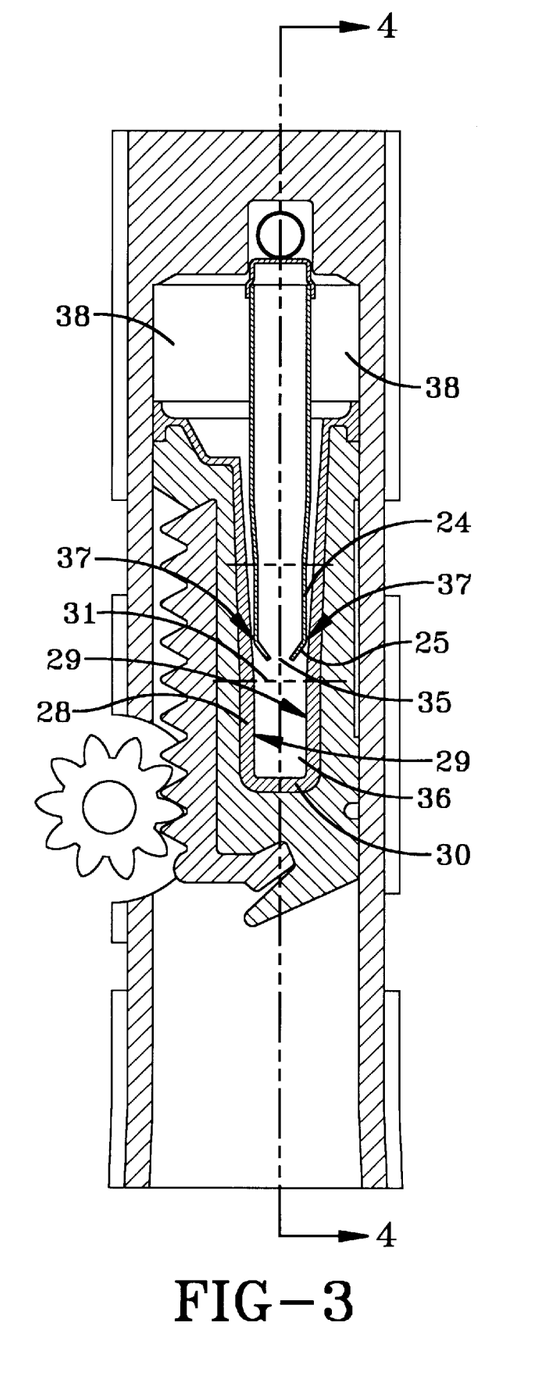
FIG. 3 is a view according to FIG. 1 of the device with an advanced step piston in engagement with a driving pinion.
Figure 4:
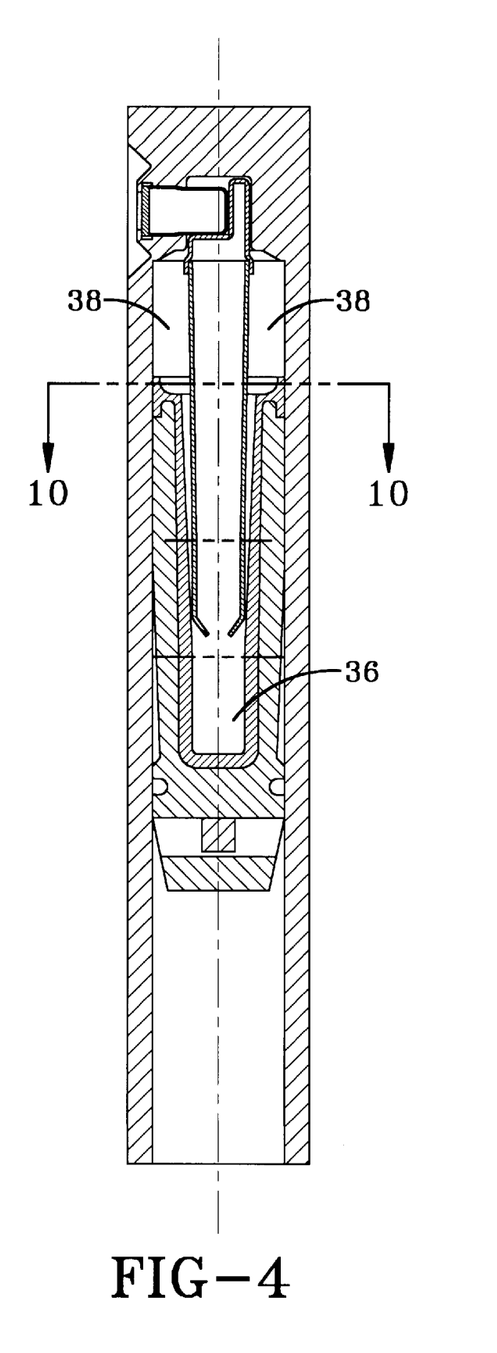
FIG. 4 is a section along line 4—4 in FIG. 3.
Figure 5:
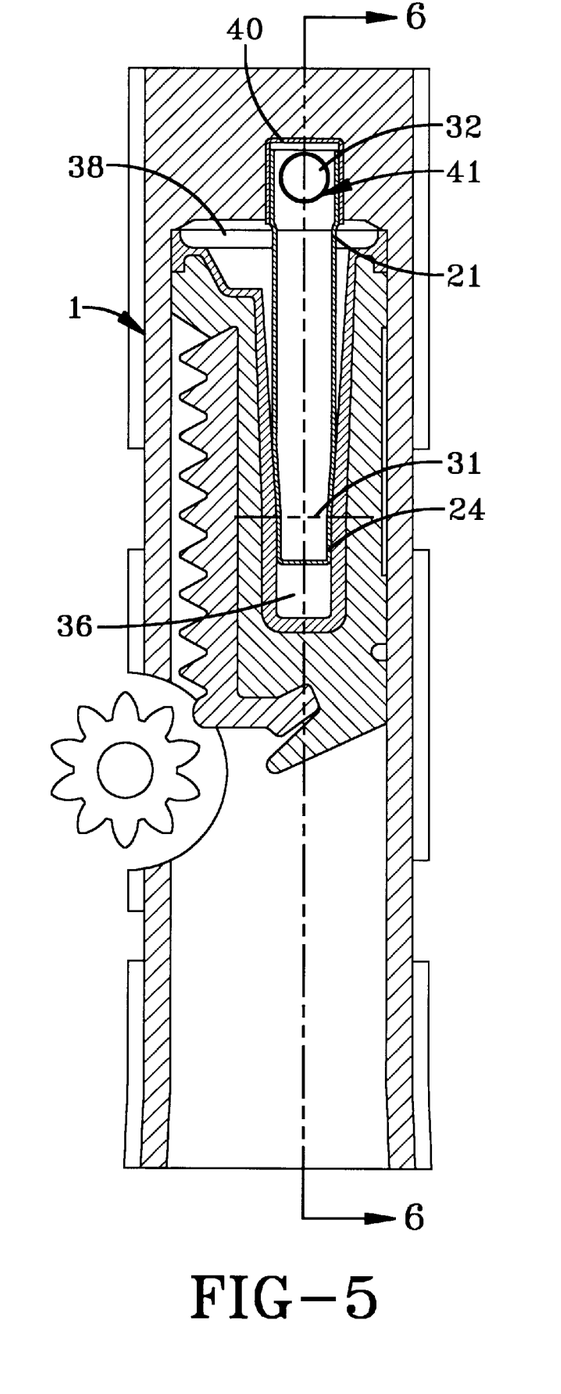
FIG. 5 is a longitudinal section through a second embodiment of a device according to the invention with a step piston in a starting position.
Figure 6:
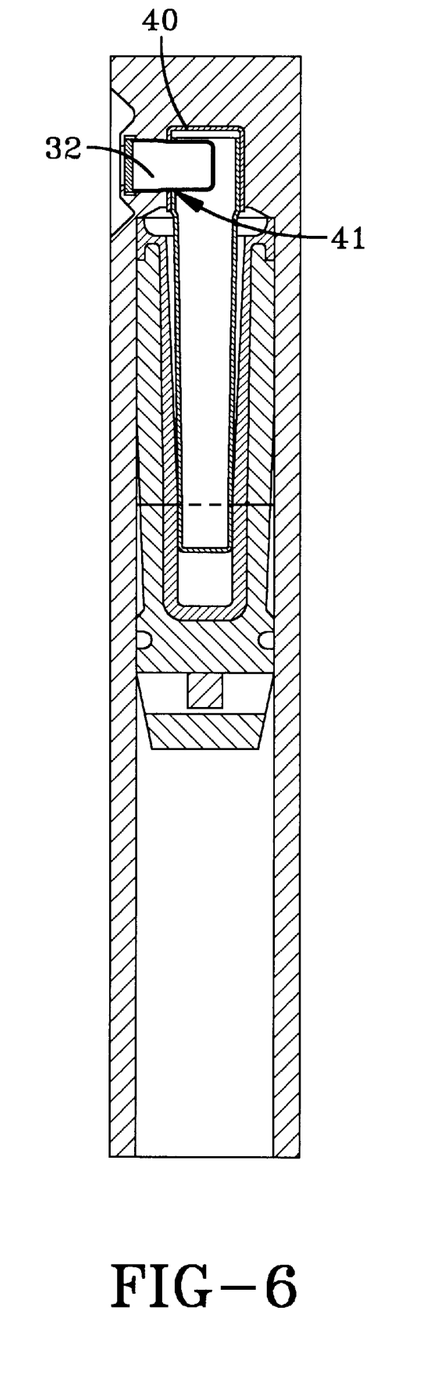
FIG. 6 is a section along line 6—6 in FIG. 5.
Figures 7, 8:
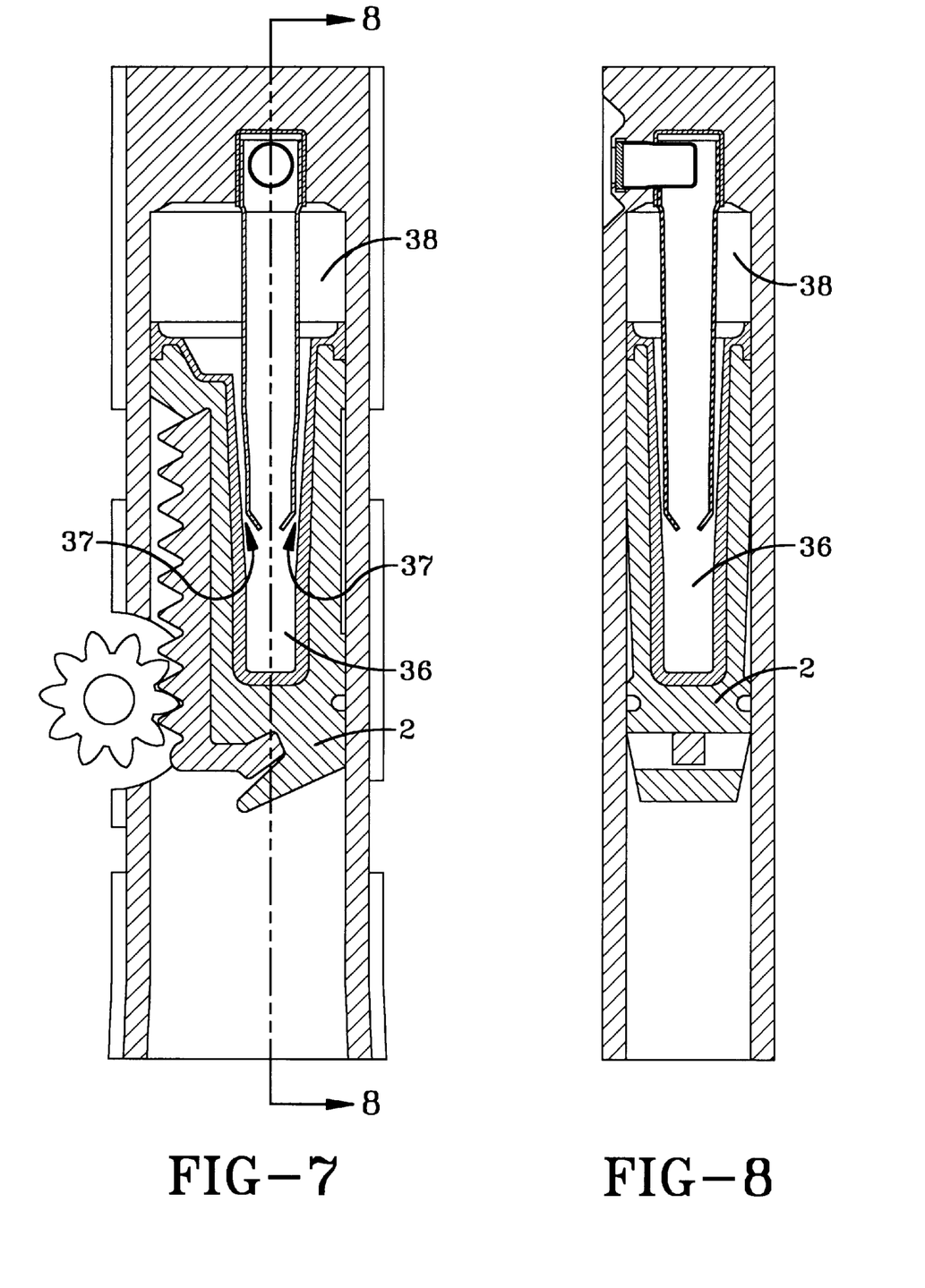
FIG. 7 is a view according to FIG. 5 of the device with an advanced step piston in engagement with a driving pinion.
FIG. 8 is a section along line 8—8 in FIG. 7.

Since the driving pressure face of the second pressure chamber 38 is considerably larger than that of the first pressure chamber 36, for example by a factor of about 10, a force which is greater by this factor additionally acts on the step piston 2 and accelerates it accordingly, with a much greater propulsive thrust.

A second embodiment of a device according to the invention (see FIGS. 5 to 8) has a charge carrier for the propellant which is modified in relation to the first example and in which a sleeve-shaped closure cap 40 is pressed onto a casing 21 which is lengthened on the cap side. The sleeve-shaped closure cap 40 has a shape adapted to the ignition chamber 23 and is pressed into the ignition chamber. The closure cap 40 and the casing 21 have a lateral orifice 41 through which the percussion igniter 32 penetrates into the interior of the closure cap 40 and the casing 21. Upon ignition of the percussion igniter 32, the ignition flame ignites the propellant charge contained in the casing 21. The closure cap 40 must not be pierced. The design and mode of operation otherwise corresponds to the first embodiment.

Instead of arranging the, for example, powdered propellant charge in the casing 21, the propellant charge, or generally a gas producing unit, can also be mounted outside the tubular casing or the guide tube 1 so that the tubular casing serves merely as an inlet tube for the propellant gas produced outside.

An electric igniter can be used instead of a mechanical percussion igniter to ignite the propellant charge.

The tubular casing 21 can have a circular or oval cross section, the internal faces of the sealing insert 20 being adapted to a casing shaped in this way. With a circular casing, however, it is desirable also to design the recess 13 in the step piston 2 with a circular cross section.

The piston end face 12 defining the second pressure chamber 38 can be substantially plane, beveled towards the recess 13 or provided with additional indentations. The recess and/or the sealing insert 20 are able to open slightly in the form of a funnel toward the second pressure chamber 38 so that the cross section of the overflow or discharge orifice 37 is enlarged during the movement of the step piston 2 and allows greater permeation of propellant gas.

The moment of opening of the overflow or discharge orifice 37 can be determined as a function of the path of movement covered by the step piston 2 by differing design of the length of the discharge portion 24.

Figure 10:
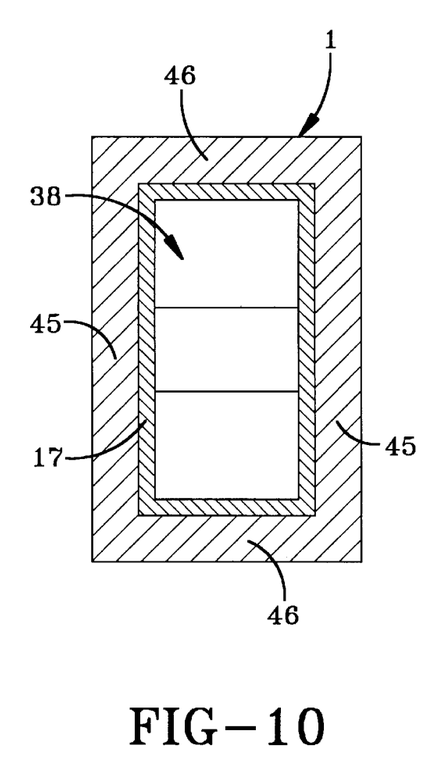
FIG. 10 is a cross section along line 10—10 in FIG. 4. This figure shows the guide tube of the device with the step piston in a schematic view.
Figure 11:
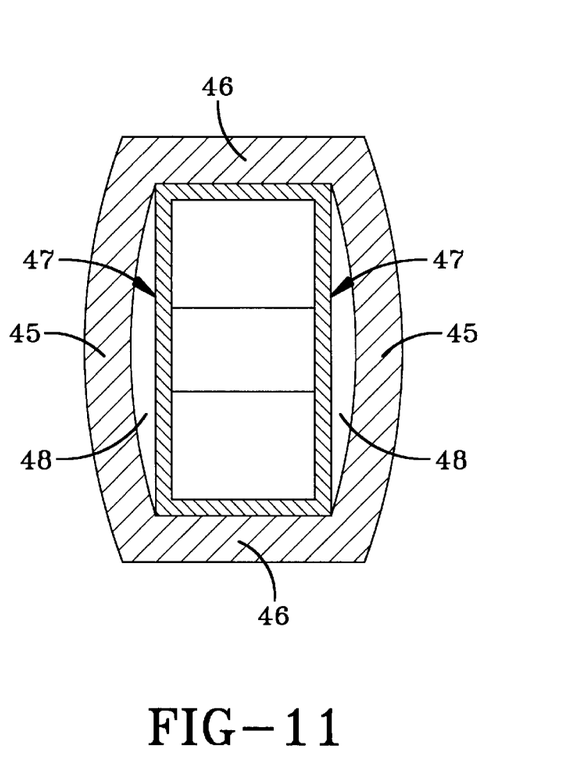
FIG. 11 is a cross section corresponding to FIG. 10 through the guide tube with lateral walls deformed by excess pressure.

FIGS. 10 and 11 show schematically a guide tube 1 produced from aluminum of a device according to the invention in a cross section perpendicular to a longitudinal axis or to the center line 14. The guide tube has an internal or pressure chamber 38 with a rectangular cross section contains long and short lateral walls 45, 46 defining this internal or pressure chamber 38. The wall thickness of the two long lateral walls 45 are so dimensioned that the two lateral walls 45 substantially maintain the rectangular cross section up to a maximum permitted propellant gas pressure in the internal or pressure chamber 38 and the piston seal 17 still seals the pressure chamber. If the propellant gas pressure increases beyond this maximum permitted value, for example if the driving piston is blocked during its forward movement or in the end position for movement of the piston, the two long lateral walls 45 are deformed and bend outwards (see FIG. 11). Between the two mutually remote external piston faces 47 and the associated deformed lateral walls 45 there is formed a respective orifice 48 which can no longer be sealed by the piston seal 17 or by the sealing rim as a result of the high propellant gas pressure and therefore forms an excess pressure discharge path and a pressure relief device.

The foregoing specification discloses and describes exemplary embodiments of the present invention. One skilled in the art will readily recognize that various changes, modifications and variations can be made therein without departing from the spirit and scope of the invention as defined in the following claims.

What is claimed is:

1. A device for tightening a seatbelt comprising:
    a piston-like drive member arranged in a guide tube,
    a drive means for producing a propellant gas which drives the drive member by expanding in a pressure chamber adjoining the drive member, and a movement transmitting system connecting the drive member and the seatbelt to be tightened,
    the drive member is a step piston which is provided with a first pressure chamber and a second pressure chamber, in that a propellant gas discharge system for supplying the propellant gas into the pressure chambers in the starting position of the step piston adjoins the latter in such a way that the first and second pressure chambers are separated from one another with a discharge orifice positioned between the first and second pressure chambers and the propellant gas initially flows into the first pressure chamber, said propellant gas discharge system comprises a tubular casing mounted in a closed end part of the guide tube and a tubular discharge portion that extends in an axial longitudinal direction into a recess, forming the first pressure chamber, in the step piston and is sealed at its periphery against internal face of the recess;
    a closure cap mounted in the closed end part of the tubular casing, the closure cap having an ignition system, wherein the ignition system penetrates into the closure cap through an orifice in the closure cap; and
    the step piston which is set into motion by the propellant gas acting in the first pressure chamber clears the discharge orifice into the second pressure chamber after covering a first distance so that the propellant gas flowing into the second pressure chamber and acting therein to additionally drive the step piston.

2. The device for tightening a seatbelt according to claim 1 wherein the ignition system is a mechanical percussion igniter.

3. The device for tightening a seatbelt according to claim 1 wherein the tubular casing is designed as a charge carrier for a pyrotechnic propellant charge.

4. The device for tightening a seatbelt according to claim 3 wherein the tubular discharge portion comprises a leading axial discharge orifice.

5. The device for tightening a seatbelt according to claim 4 wherein the leading axial discharge orifice of the tubular discharge portion is closed, and opens as a result of the pressure of the ignited propellant charge.

6. The device for tightening a seatbelt according to claim 5 wherein a closure element of the leading axial discharge orifice comprises a notch or weakened area.

7. The device for tightening a seatbelt according to claim 1 wherein the second pressure chamber is defined by a piston end face.

8. The device for tightening a seatbelt according to claim 7 wherein the size ratio of the faces, effective for driving the step piston, of the first and second pressure chamber is about 1 to 10 on the step piston.

9. The device for tightening a seatbelt according to claim 8 wherein a sealing element is arranged in the recess in the region of the tubular discharge element and seals it against the internal face of the recess.

10. The device for tightening a seatbelt according to claim 8 wherein a sealing insert is arranged on the lateral walls of the step piston defining the first pressure chamber and rests on the periphery of the discharge portion.

11. The device for tightening a seatbelt according to claim 1 wherein the walls of the step piston adjoining the two-pressure chambers comprise a sealing coating.

12. The device for tightening a seatbelt according to claim 11 wherein the recess on the first pressure chamber comprises an internal region with a cross section which is constant over the axial length of the first path of movement and an adjoining outer region with an enlarged cross section, the enlarged cross section forming the discharge orifice from the first to the second pressure chamber.

13. The device for tightening a seatbelt according to claim, 12 wherein the cross section of the outer region increases continuously.

14. The device for tightening a seatbelt according to claim 13 wherein the movement transmitting system comprises a rack on the step piston and a pinion that can engage with the rack and is coupled to a winding shaft of an automatic seatbelt retractor for the seatbelt.

15. A device for tightening a seatbelt comprising:
    a piston-like drive member arranged in a guide tube,
    a drive means for producing a propellant gas which drives the drive member by expanding in pressure chambers adjoin the drive member, and a movement transmitting system connecting the drive member and the seatbelt to be tightened, the drive member is a step piston which is provided with a first pressure chamber and a second pressure chamber, in that a propellant gas discharge system for supplying the propellant gas into the pressure chambers in the starting position of the step piston adjoins the latter in such a way that the first and second pressure chambers are separated from one another with a discharge orifice positioned between the first and second pressure chambers, and the propellant gas initially flows into the first pressure chamber, said propellant gas discharge system comprises a tubular discharge portion that extends in an axial longitudinal direction into a recess, forming the first pressure chamber, in the step piston and is sealed at its periphery against an internal face of the recess, said recess comprises an internal region with a cross section which is constant over the axial length of the first path of movement and an adjoining outer region with an enlarged cross section, the enlarged cross section forming the discharge orifice from the first to the second pressure chamber; and the step piston which is set into motion by the propellant gas acting in the first pressure chamber clears the discharge orifice into the second pressure chamber after covering a first distance so that the propellant gas flowing into the second pressure chamber and acting therein to additionally drive the step piston.

16. The device for tightening a seatbelt according to claim 15 wherein the cross section of the outer region increases continuously.

17. The device for tightening a seatbelt according to claim 16 wherein the movement transmitting system comprises a rack on the step piston and a pinion that can engage with the rack and is coupled to a winding shaft of an automatic seatbelt retractor for the seatbelt.

18. The device for tightening a seatbelt according to claim 15 wherein the second pressure chamber is defined by a piston end face.

19. A device for tightening a seatbelt comprising:

a piston-like drive member arranged in a guide tube, a drive means for producing a propellant gas which drives the drive member by expanding in pressure chambers adjoining the drive member, and a movement transmitting system connecting the drive member and the seatbelt to be tightened, the drive member is a step piston which is provided with a first pressure chamber and a second pressure chamber, in that a propellant gas discharge system for supplying the propellant gas into the pressure chambers in the starting position of the step piston adjoins the latter in such a way that the first and second pressure chambers are separated from one another with a discharge orifice positioned between the first and second pressure chambers and the propellant gas initially flows into the first pressure chamber, said propellant gas discharge system comprises a tubular discharge portion which extends in an axial longitudinal direction into a recess, forming the first pressure chamber in the step piston and is sealed at its periphery against an internal face of the recess, and the second pressure chamber is defined by a piston end face; and the step piston which is set into motion by the propellant gas acting in the first pressure chamber clears the discharge orifice into the second pressure chamber after covering a first distance so that the propellant gas flowing into the second pressure chamber and acting therein to additionally drive the step piston.

20. The device for tightening a seatbelt according to claim 19 wherein the size ratio of the faces, effective for driving the step piston, of the first and second pressure chambers is about 1 to 10 on the step piston.

21. The device for tightening a seatbelt according to claim 19 wherein said recess comprises an internal region with a cross section which is constant over the axial length of the first path of movement and an adjoining outer region with an enlarged cross section, the enlarged cross section forming the discharge orifice from the first to the second pressure chamber.

* * * * *